Figure 1:
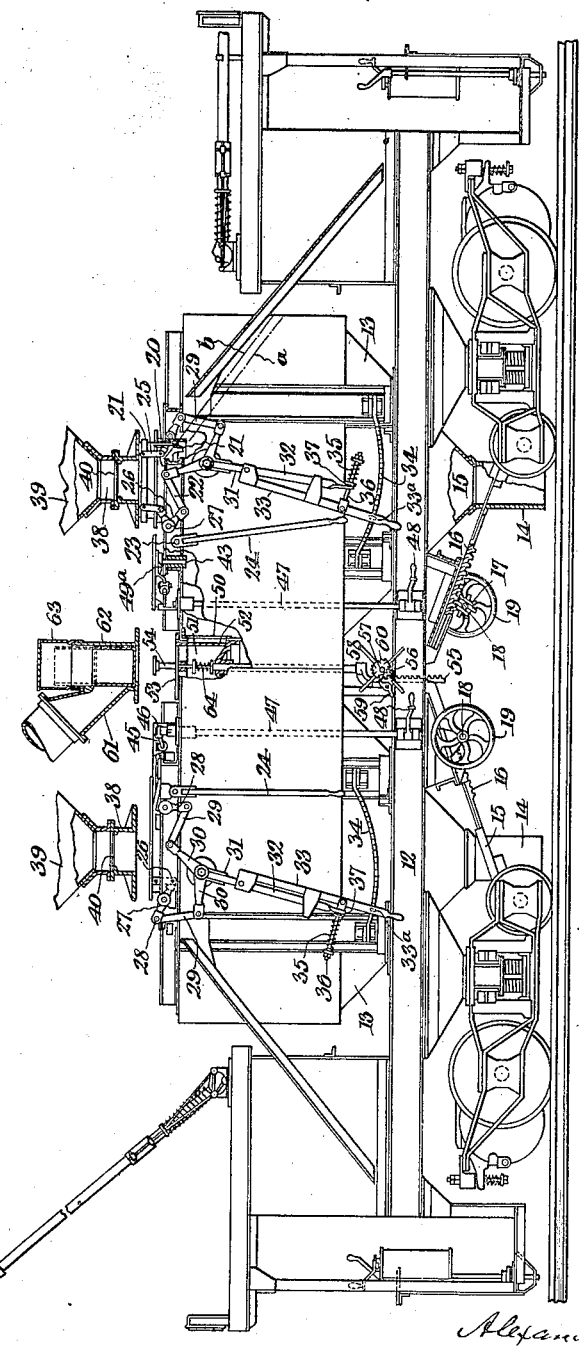

Apr. 10, 1923.

A. G. McGREGOR

CALCINE CAR

Filed Sept. 17, 1921

1,450,980

2 sheets-sheet 1

Inventor:
Alexander G. McGregor,
By
Attorneys

Apr. 10, 1923.
A. G. McGREGOR
CALCINE CAR
Filed Sept. 17, 1921
1,450,980
2 sheets-sheet 2
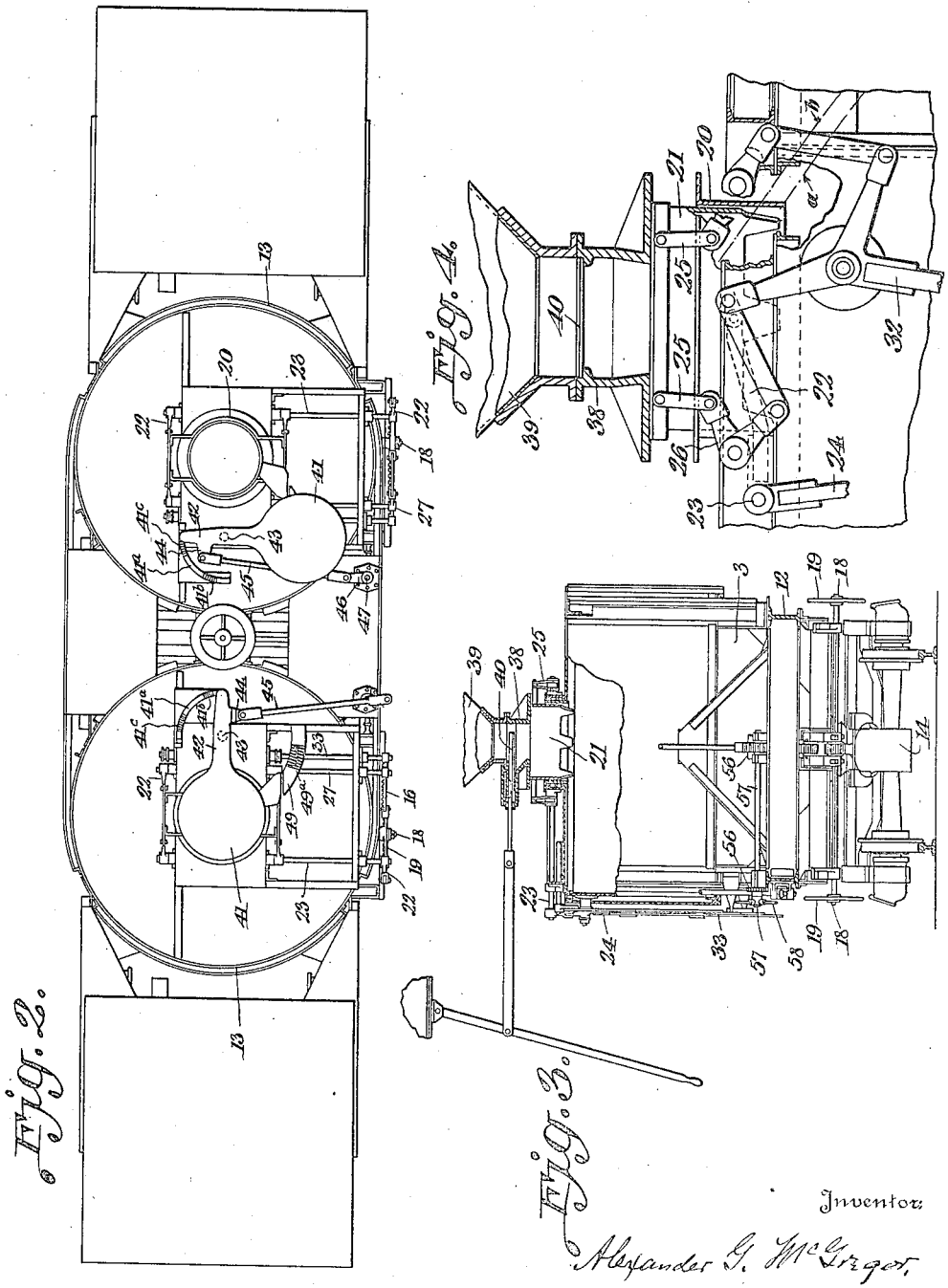
Inventor
Alexander G. McGregor,
By
Attorneys Patented Apr. 10, 1923.

1,450,980

UNITED STATES PATENT OFFICE.

ALEXANDER GRANT McGREGOR, OF WARREN, ARIZONA.

CALCINE CAR.

Application filed September 17, 1921. Serial No. 501,383.

*To all whom it may concern:*

Be it known that I, ALEXANDER G. MC-GREGOR, a citizen of the United States, residing at Warren, in the county of Cochise and State of Arizona, have invented or discovered certain new and useful Improvements in Calcine Cars, of which the following is a specification, reference being had therein to the accompanying drawings.

In extracting copper from its ore, the ores or concentrates are often roasted in roaster furnaces, and the calcine, which is the product of the roaster furnaces, is smelted in reverberatory furnaces. Usually these roaster furnaces are some distance from the reverberatory furnaces, and the calcine is delivered from the roaster furnaces to the reverberatory furnaces in what are called calcine cars. Also the dust, which is called flue dust, and which is collected in dust chambers, Cottrell treaters and flues, is collected in the calcine cars and charged into the reverberatory furnaces.

According to the usual present practice, the calcine hopper of the roaster furnace has had a slide gate at its bottom, and a short spout or chute through which dust is drawn and deposited in the calcine car. The calcine car usually has an opening somewhat larger in diameter than the chute, and there is usually several inches clearance between the chute and the top of the car. The calcine is dusty, as is also the flue dust, with the result that much of the dust is thrown out of the car opening in the form of a cloud, causing a loss of valuable dust and causing serious annoyance to the attendant. Also, if the attendant does not watch closely, the gate in the chute may not be shut in time to prevent an overflow of dust on top of the car. Then when the car is moved to the furnace the wind blows the dust off the car, or it may be jarred from the top of the car, and this also entails loss of valuable dust.

In the construction shown and described in my pending application filed June 21, 1920, Serial No. 390,466, the loss of valuable dust in filling calcine cars is prevented by means of flanged sleeves mounted at the lower ends of the discharge chutes below the hoppers or bins containing the fine calcine material, and which sleeves are lowered in contact with the tops of the calcine cars when the latter are being filled from the said hoppers or bins in which the fine calcine material is stored. As, however, there may be a large number, say a hundred or more, of chutes in a given plant, and only two or three calcine cars in operation in connection with these chutes, it is obvious that a considerable saving may be effected by equipping the cars, rather than the chutes, with means for making tight connections between the chutes and the cars when the latter are being loaded. It is therefore the object of this invention to provide effective means, mounted on the calcine cars, for making tight connections between the said cars and the chutes and for preventing waste of the valuable calcine dust during the filling or loading of the cars and after the cars have been filled, all as will hereinafter more fully appear.

In the accompanying drawings Fig. 1 is an elevation of a calcine car embodying my invention, the car being in loading position beneath the discharge chutes of the calcine hoppers or bins. Fig. 2 is a plan view of the calcine car shown in Fig. 1. Fig. 3 is a partly broken out end view of the same. Fig. 4 is an enlarged detail view showing the car in operative relation with the discharge chute of the calcine hopper.

Referring to the drawings, 12 denotes a portion of the framework of the car which may, generally, be of any usual or well-known construction, and which is equipped, beneath the framework, with the usual trucks comprising springs for cushioning the jars or vibration of the cars. Mounted on the car herein shown are two receptacles or hoppers 13 having depending discharge spouts or chutes 14 which may be closed by sliding gates 15 connected with rack bars 16 with which mesh pinions 17 on shafts 18 which may be operated by hand wheels 19. Each receptacle or hopper has at its top a filling opening at its otherwise closed top, and within each opening is an outer sleeve 20 provided with an annular flange, and, within each of said outer sleeves and telescopically movable therein, is an inner sleeve 21. For simplicity of description these similar devices on the two receptacles or hoppers 13 will now generally be referred to in the singular. The outer sleeve 20 has jointed connections with arms 22 carried by a rock shaft 23 suitably mounted at the top of the hopper and provided with a handle-lever 24 by which the said rock shaft may be operated to raise and lower the said outer sleeve, or to shake it up and down.

The inner sleeve 21 is connected by links 25 with arms 26 on rock shafts 27 mounted at the top of a receptacle 13, said rock shafts having other arms 28 connected by links 29 with two arms 30 of a three-armed lever, the third arm 31 of said lever having a long extension 32. An operating handle-lever 33 is pivotally connected near its outer end to the extension 32, said operating handle-lever having on its inner face a lug or tooth 33$^a$ for engagement with the teeth of a toothed bar or quadrant 34 so that said handle-lever may be maintained in any desired position of adjustment. The extension 32 of the arm 31 is yieldingly mounted with reference to the handle-lever 33 by virtue of a coil spring 35 on the bar or rod 36 attached to said handle-lever 33. The rod 36 is embraced by the slotted or forked lower end of the extension 32 and preferably abuts against a collar 37 slidingly mounted on said rod and which collar is yieldingly held against the said lower end of said extension 32 by said coil spring. The inner sleeve 21 may be lifted into contact with the lower end of a flanged discharge chute 38 of a storage bin or hopper 39 by operating the handle-lever 33, which handle-lever will be held in any desired position of adjustment by the toothed bar or quadrant 34; but as the car becomes filled, in loading, the said inner sleeve will still be held in close contact with said discharge chute, as the car settles on its springs, by virtue of the yielding connection just described and afforded by the coil spring 35.

To avoid waste or overflow of the material in filling a car receptacle the outer sleeve, when in its normal or lowered position, extends some little distance downward into the chamber of the car receptacle 13, so that when the said receptacle is filled and the material extends up into the discharge chute 38 the angle of repose of the top of the material, when the car is properly filled or loaded, will be denoted by the dotted line $a$. The calcine gate 40 in the chute 38 will now be closed, and then by shaking the outer sleeve by operating the handle-lever 24 back and forth, the material below the closed calcine gate may be caused to settle down into the car with an angle of repose about like that indicated by dotted line $b$. It will thus be understood that all of the material lodged in the lower end of the chute 38 and in the sleeve 21 may be caused to settle down below the top of the car receptacle 13, and there will be no material which will spill out on the top of said receptacle, to be blown about and thus wasted, when the inner sleeve 21 has been lowered to its normal position shown at the left of Fig. 1.

After the car hopper or receptacle has been filled the filling opening in the top of the car hopper will be closed by a swinging gate or cover 41, shown in closed position at the left part of Fig. 2, and in open position at the right part of said figure. The cover 41 is provided with an extension 42 suitably pivoted at 43 to the top of the car receptacle 13, said extension having a side lug 44 connected by a link 45 with a crank arm 46 at the upper end of an operating shaft 47 mounted at the side of the car and provided near its lower end with an operating handle 48 by which it may be turned in opening and closing the cover 41. The cover 41, when closed, fits tightly down on the top of the filling opening of the car hopper 13, and is frictionally held in closed position, by virtue of a guide bar 41$^a$ having inclines 41$^b$ and 41$^c$ over which the tail piece of the extension or shank 42 of the cover swings, and when being swung to open position the cover rests upon a guide bar 49 which is preferably provided with an inclined or cam portion 49$^a$ which, in co-operation with the incline 41$^c$ will raise said cover slightly as it is swung to open position and thus avoid a too strong frictional contact with the top of the receptacle by sagging down.

When the car hoppers or receptacles 13 are being filled from the storage bins or hoppers 39 there must necessarily be an escape of air which is replaced by the material running down into the car receptacles, and this air is, of course, laden with calcine dust. To this end each hopper or receptacle 13 is provided on one side near its top with an opening, as 50, which communicates with a vent chamber 51, said opening to said chamber being normally closed by a dust vent gate 52 having a partly open top 53. Connected with the gate 52 is a vertically movable lifting rod 54 to the lower end of which is attached a rack bar 55 which is engaged by a pinion 56 on a shaft 57 provided at one side of the car with a turnstile or handle-wheel 58. By turning the said turnstile or handle wheel 58 the vent gate 52 may be raised or lowered; and when in raised position backward rotation of the shaft 57 will be prevented by a pawl 59 engaging a ratchet wheel 60 on said shaft.

The vent chamber 51 is arranged to be placed in communication with a vent pipe 61 which will in turn be in connection with a suitable dust chamber, so that the calcine dust carried by the escaping air, as the car hoppers are being filled, will be conveyed to such dust chamber and will consequently be saved. The lower end of the dust vent pipe 61 is normally closed by a bucket gate or valve 62 adapted to be raised and lowered in a chamber afforded by a sleeve or hollow cylinder 63. The said bucket gate is lifted, by the pusher at the top of the rod 54, to permit an open passageway from the chamber last referred to to the dust vent pipe, when the vent gate 52 is lifted to open the vent openings 50 from the hoppers or receptacles or the cars to the vent chamber 51. The said vent gate 52 when lifted, affords a laterally closed passageway from the vent chamber 51 to the chamber of the cylinder 63, and thus to the dust vent pipe 61. To this end the vent gate lifting rod 54 is provided at its upper part with an extension 54ª the enlarged upper end of which will abut against the bottom of the bucket gate or valve 62 and lift the said gate or valve into the position denoted by dotted lines in Fig. 1 when the said vent gate is opened. A coil spring 64, encircling the valve lifting rod 54, enables the said rod to maintain the valves or gates 52—53 and 62 in their proper positions, when lifted, notwithstanding some slight settling of the car as it is being loaded.

Although the above description is mainly in the singular as describing one set of the devices as applied to one of the receptacles or hoppers 13, it will be understood that as these devices are duplicates the description of one set of devices will apply to the two sets shown and described, and where the invention as hereinafter claimed in the singular, as applied to the devices mounted on one calcine receptacle or hopper, it will be understood that claims which cover the invention in the singular will also cover the same in the plural.

In the use of my invention, when the calcine car is to be loaded, it is located as shown in Fig. 1 so that the openings in the tops of the receptacles or hoppers 13 are directly beneath the chutes 38 at the bottoms of the storage bins or hoppers 39 containing the calcine. The covers 41 of the openings in the tops of the car receptacles or hoppers 13 are then swung to open position as indicated at the right of Fig. 2, by operating the shafts 47 by their handles 48, said shafts being connected with said covers, as hereinbefore described. The vent gate 52 is then lifted to the position denoted in dotted lines in Fig. 1 by turning the trunstile or handle wheel 58, thus establishing a vent connection between the chambers of the car receptacles or hoppers and the dust vent pipe 61. The inner sleeves 21 are then lifted to the position shown at the right in Fig. 1 by operating the handle bars 33, and engaging the same with the rack bars or quadrants 34 several notches beyond the point which they would assume when the sleeves first bear against the flanges of the calcine chutes 38, so that the said inner sleeves will be held firmly against the said chutes even after the car settles due to the increased load on the car springs. The calcine gates 40 in the chutes 38 are then opened and the car receptacles allowed to fill, but owing to the outer sleeves 20, which extend down into the tops of the chambers of the car receptacles or hoppers, the said receptacles or hoppers will not be entirely filled, the angle of repose of the material, when the flow of the same ceases, being indicated by the dotted line $a$. The calcine gates 40 in the chutes 38 are then closed, and after this has been done the said inner sleeves will be shaken up and down by operating the handle levers 24, thus permitting the material which may be in the chutes 38 below the closed calcine gates 40 and within the inner sleeves 21, to flow down below the tops of the car receptacles or hoppers, the material at this time assuming an angle of repose as above indicated by the dotted line $b$. This avoidance of the over filling of the car receptacles, prevented by the outer sleeves 20, obviates the necessity of closely watching the filling or loading operation and avoids spilling the valuable calcine dust on the tops of the receptacles, to be blown away and wasted.

The outer sleeves are then allowed to drop down so that their peripheral flanges rest on the tops of the car receptacles or hoppers and the inner sleeves are then lowered so that they rest on the outer sleeves, as denoted at the left part of Fig. 1. The pawl 59 is then released from the ratchet wheel 60 and the turnstile or handle wheel is operated to lower the vent gate 52 to the position denoted in full lines in Fig. 1, thus lowering the bucket gate 62, and closing the lower end of the dust vent pipe 61. The covers 41 will then be swung back over the filling openings in the tops of the car receptacles or hoppers by reversely operating the handles 48 on the shafts 47 connected with said covers, the latter being now held down tightly over the said opening by the means hereinbefore described. This closing of the receptacles 13 by the covers 41 is desirable for the reason that small clouds of calcine dust will otherwise continue to rise through the filling openings after the filling or charging operation has stopped.

Having thus described my invention I claim and desire to secure by Letters Patent:

1. A calcine car provided with a receptacle having a closed top with a filling opening therein, and vertically extensible means mounted on said receptacle for forming a laterally closed conduit between said filling opening and a chute at the bottom of a storage bin.

2. A calcine car provided with a receptacle having a closed top with a filling opening therein, and yielding, vertically extensible means mounted on said receptacle for forming a laterally closed conduit between said filling opening and a chute at the bottom of a storage bin.

3. A calcine car provided with a receptacle having a closed top with a filling opening therein, and vertically extensible means mounted on said receptacle for forming a laterally closed conduit between said filling opening and a chute at the bottom of a storage bin, said extensible means comprising a vertically movable sleeve normally resting on the top of said receptacle.

4. A calcine car provided with a receptacle having a closed top with a filling opening therein, and yielding, vertically extensible means mounted on said receptacle for forming a laterally closed conduit between said filling opening and a chute at the bottom of a storage bin, said extensible means comprising a vertically movable sleeve normally resting on the top of said receptacle.

5. A calcine car having a receptacle with a closed top provided with a filling opening, a sleeve within said opening, a lever and suitable connections to said sleeve whereby said sleeve may be lifted into contact with a chute at the bottom of a storage bin, to form a laterally closed conduit, when said receptacle is to be filled, and means for holding said lever in any desired position of adjustment.

6. A calcine car having a receptacle with a closed top provided with a filling opening, a sleeve within said opening, a lever and suitable connections to said sleeve whereby said sleeve may be lifted into contact with a chute at the bottom of a storage bin, to form a laterally closed conduit, when said receptacle is to be filled, and means for holding said lever in any desired position of adjustment, said connections between said lever and said sleeve comprising a spring-pressed member so that said sleeve will be held up against said chute when the car settles as the load on the car increases.

7. A calcine car having a receptacle with a closed top provided with a filling opening, a sleeve within said opening, a lever and suitable connections to said sleeve whereby said sleeve may be lifted into contact with a chute at the bottom of a storage bin, to form a laterally closed conduit, when said receptacle is to be filled, means for holding said lever in any desired position of adjustment, an outer sleeve surrounding said first-named sleeve within said opening, said outer sleeve normally extending down into the top of the chamber of said receptacle, and means for lifting and shaking said outer sleeve when desired.

8. A calcine car having a receptacle with a closed top provided with a filling opening, a sleeve within said opening, a lever and suitable connections to said sleeve whereby said sleeve may be lifted into contact with a chute at the bottom of a storage bin, to form a laterally closed conduit, when said receptacle is to be filled, means for holding said lever in any desired position of adjustment, said connections between said lever and said sleeve comprising a spring-pressed member so that said sleeve will be held up against said chute when the car settles as the load on the car increases, an outer sleeve surrounding said first-named sleeve within said opening, said outer sleeve normally extending down into the top of the chamber of said receptacle, and means for lifting and shaking said outer sleeve when desired.

9. A calcine car receptacle provided at or near its top with an air and dust vent opening to a vent chamber, a vent gate mounted on said car, for normally closing said opening and adapted, when lifted, to form a tubular connection with a vent dust pipe, and means on said car for lifting said gate to opened position.

10. A calcine car receptacle provided at or near its top with an air and dust vent opening to a vent chamber, a vent gate mounted on said car, for normally closing said opening and adapted, when lifted, to form a tubular connection with a vent dust pipe, means on said car for lifting said gate to opened position, a rod for lifting said gate, a rack and pinion for operating said rod, means for operating said rack and pinion, and means for holding said gate in lifted position.

11. A calcine car receptacle provided at or near its top with an air and dust vent opening to a vent chamber, a vent gate mounted on said car, for normally closing said opening and adapted, when lifted, to form a tubular connection with a vent dust pipe, means on said car for lifting said gate to opened position, a rod for lifting said gate, a rack and pinion for operating said rod, means for operating said rack and pinion, means for holding said gate in lifted position, a shaft by which said pinion is carried, a ratchet-wheel on said shaft, and a detent pawl for engaging said ratchet wheel to hold it against backward movement.

12. A calcine car receptacle provided at or near its top with an air and dust vent opening to a vent chamber, a vent gate mounted on said car, for normally closing said opening and adapted, when lifted, to form a tubular connection with a vent dust pipe, means on said car for lifting said gate to opened position, a rod for lifting said gate, a rack and pinion for operating said rod, means for operating said rack and pinion, means for holding said gate in lifted position, and yielding means, movable with said gate, for opening a gate which normally closes the lower end of said vent dust pipe.

13. A calcine car receptacle having a closed top provided with a charging opening, a horizontally swinging cover for closing said opening, said cover having an extension by which it is pivoted to the top of said receptacle, and an inclined guide-bar on said receptacle over which the tail piece of said extension may swing and by virtue of which guide-bar and tail piece said cover is held tightly down over said opening, when closed.

14. A calcine car receptacle having a closed top provided with a filling or charging opening, a horizontally swinging pivoted cover for closing said opening, and means for operating said cover to open and close said opening, said operating means comprising a vertical shaft having a handle at its lower part, a crank at the upper end of said shaft and a link connecting said crank with said pivoted cover.

15. A calcine car receptacle having a closed top provided with a charging opening, a horizontally swinging cover for closing said opening, said cover having an extension pivoted to the top of said receptacle, said extension having a tail piece, means for operating said cover to open and close said opening, and an inclined guide bar arranged to be engaged by said tail piece, for lifting said cover slightly as it is swung to open position.

In testimony whereof I affix my signature.

ALEXANDER GRANT McGREGOR.